United States Patent
Ladvánszky et al.

(10) Patent No.: US 10,044,446 B2
(45) Date of Patent: Aug. 7, 2018

(54) OPTICAL COMMUNICATION SYSTEM AND DEVICE FOR LINEARIZING NON-LINEAR SIGNAL TRANSMISSION CHARACTERISTICS

(71) Applicant: Telefonaktiebolaget LM Ericsson (publ), Stockholm (SE)

(72) Inventors: János Ladvánszky, Pomaz (HU); Boris Dortschy, Hägersten (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/506,645

(22) PCT Filed: Sep. 4, 2014

(86) PCT No.: PCT/SE2014/051020
§ 371 (c)(1),
(2) Date: Feb. 24, 2017

(87) PCT Pub. No.: WO2016/036292
PCT Pub. Date: Mar. 10, 2016

(65) Prior Publication Data
US 2017/0288783 A1   Oct. 5, 2017

(51) Int. Cl.
*H04B 10/50* (2013.01)
*H04B 10/58* (2013.01)

(52) U.S. Cl.
CPC ........... *H04B 10/58* (2013.01); *H04B 10/503* (2013.01)

(58) Field of Classification Search
CPC .............................. H04B 10/58; H04B 10/503
See application file for complete search history.

(56) References Cited

U.S. PATENT DOCUMENTS

| 5,798,854 A | 8/1998 | Blauvelt et al. |
| 2008/0024185 A1 | 1/2008 | Mukherjee et al. |
| 2014/0267632 A1* | 9/2014 | Ward ..................... G02B 21/22 348/47 |

FOREIGN PATENT DOCUMENTS

EP   0486953 A2   5/1992

OTHER PUBLICATIONS

International Search Report and Written Opinion, Application No. PCT/SE2014/051020, dated May 27, 2015, 12 pages.
Zhan Xu et al., "A predistortion circuit design technique for high performance analogue optical transmission," Oct. 15, 2008, pp. 213-216, Microsystems and Nanoelectronics Research Conference (MNRC), IEEE.

(Continued)

*Primary Examiner* — Leslie C Pascal
(74) *Attorney, Agent, or Firm* — NDWE LLP

(57) ABSTRACT

A device for linearizing non-linear signal transmission characteristics of an optical communication system. A non-linearity introducing part is between an input port and an output port of the optical communication system. The non-linearity introducing part at least partly causes said non-linear signal transmission characteristics. The device is configured for connection between said input port and the non-linearity introducing part, in parallel with the non-linearity introducing part, and comprises a pair of Junction Field Effect Transistors (JFETs), configured to operate in an anti-parallel configuration.

10 Claims, 2 Drawing Sheets

(56) References Cited

OTHER PUBLICATIONS

Ram Sadhwani et al., "Adaptive CMOS Predistortion Linearizer for Fiber-Optic Links," Dec. 2003, pp. 3180-3193, Journal of Lightwave Technology, vol. 21, No. 12.
Oleg Panagiev, "Adaptive Compensation of the Nonlinear Distortions in Optical Transmitters Using Predistortion," Dec. 2008, pp. 55-58, Radioengineering, vol. 17, No. 4.
L. Roselli et al., "Analog Laser Predistortion for Multiservice Radio-Over-Fiber Systems," May 2003, pp. 1211-1223, Journal of Lightwave Technology, vol. 21, No. 5, IEEE.
Richard B. Childs et al., "Multichannel AM Video Transmission Using a High-Power Nd: YAG Laser and Linearized External Modulator," Sep. 1990, pp. 1369-1376, IEEE Journal on Selected Areas in Communications, vol. 8, No. 7.
International Preliminary Report on Patentability for Application No. PCT/SE2014/051020, dated Mar. 16, 2017, 10 pages.

\* cited by examiner

OPTICAL COMMUNICATION SYSTEM AND DEVICE FOR LINEARIZING NON-LINEAR SIGNAL TRANSMISSION CHARACTERISTICS

CROSS-REFERENCE TO RELATED APPLICATIONS

This application is a National stage of International Application No. PCT/SE2014/051020, filed Sep. 4, 2014, which is hereby incorporated by reference.

TECHNICAL FIELD

Embodiments herein relate to a device, such as a so called pre-distorter, for linearizing non-linear signal transmission characteristics of an optical communication system, and to an optical communication system comprising such device.

BACKGROUND

It is well known that a communication channel often involve nonlinear blocks, i.e. has non-linear transmission characteristics, that generate harmonics and intermodulation. Among intermodulation products, third order intermodulation often is most critical, because it is near in frequency to the useful signals and because from among intermodulation products, it has the most significant amplitude.

An example of an optical communication system 100 comprising such communication channel is schematically illustrated in FIG. 1. The communication channel is between an input port 110 and an output port 120, with a non-linear block 130 in-between over which communication takes place. The non-linear block 130 comprises a laser diode 131 and an optical fiber 132 and a photo diode 133. The laser diode 131 is electrically operated via the input port 110 to emit laser light for communication into and via the optical fiber 132. The photo diode is configured to receive the emitted laser light from the optical fiber and thereby generate an electrical signal at the output port 120.

In order to suppress harmonics and intermodulation in a multi-signal transmission system, a possible solution is careful channel allocation. However, this affects other channels only; intermodulation within the same channel, i.e. where it is generated, will still be an impairment.

Another possible solution is feedback based pre-distortion, e.g. as disclosed in "*Adaptive Compensation of the Nonlinear Distortions in Optical Transmitters Using Pre-distortion*", O. Panagiev, *RADIOENGINEERING*, VOL. 17, NO. 4, December 2008, pages 55-58. However, complexity and cost related to such solution are relatively high and makes it undesirable to use in many practical situations.

Yet another possible solution is to design an analogue circuits for a specific and measured non-linearity, e.g. as disclosed in "A Predistortion Circuit Design Technique for High Performance Analogue Optical Transmission", Z. Xu, L. MacEachern, Microsystems and Nanoelectronics Research Conference, 2008 (MNRC 2008), E-ISBN 978-1-4244-5 2921-9, and in "Adaptive CMOS Predistortion Linearizer for Fiber-Optic Links", R. Sadhwani, B. Jalali, *Journal of Lightwave Technology (JLT)*, VOL. 21, NO. 12, December 2003, pages 213-216. Also this kind of solution is often undesirable in practice as it has to be specifically designed for each specific non-linearity and case, even if caused by the same non-linear components type.

A yet further possible solution may be to design an analogue circuit based on anti-parallel chains of diodes, which chains are placed in series to a non-linear block, or part, such as disclosed in R. B. Childs, V. A. O'Byrne: "*Multichannel AM Video Transmission Using a High-Power Nd: YAG Laser and Linearized External Modulator*", IEEE *Journal on Selected Areas in Communications*, Vol 8, No. 7, September 1990, pp. 1369-1376.

SUMMARY

In view of the above, an object of embodiments herein is to provide improvements, or at least an alternative solution, regarding linearization of non-linearities of an optical communication system, such as of the type shown in FIG. 1. The improvements may relate to reduction of effects, in particular, but not limited to, intermodulation products, such as third order intermodulation products, caused by non-linear transmission characteristics of the optical communication system.

According to a first aspect of embodiments herein, the object is achieved by a device for linearizing non-linear signal transmission characteristics of an optical communication system. The optical communication system comprises an input port, an output port and a non-linearity introducing part between said input port and said output port. The non-linearity introducing part at least partly causes said non-linear signal transmission characteristics. Said device is configured for connection between said input port and the non-linearity introducing part, in parallel with the non-linearity introducing part. The device further comprises a pair of Junction Field Effect Transistors (JFETs) configured to operate in an anti-parallel configuration.

According to a second aspect of embodiments herein, the object is achieved by an optical communication system comprising the device according to the first aspect. The optical communication system further comprises an input port, an output port and a non-linearity introducing part between said input port and said output port. Said device is connected in parallel with the non-linearity introducing part, between said input port and the non-linearity introducing part. The device is configured to linearize non-linear signal transmission characteristics of the optical communication system, which non-linear signal transmission characteristics is at least partly caused by said non-linearity introducing part.

The non-linearities of JFETs, as used in embodiments herein, are milder and therefore more suitable to use for linearization in the present context compared to the stronger non-linearities of junction diodes as in the prior art. Also, advantages e.g. include that implementation of the JFETs configured to operate an anti-parallel configuration enable implementation of the device with a low, even minimum, number of distortion compensating elements. Additionally, compared to prior art solutions, embodiments herein comprising means for voltage biasing the pair of JFETs may be realized with comparatively low DC bias and using a DC voltage source instead of a current source and are thus easier to realize at high frequencies that typically are of interest for optical communication systems.

BRIEF DESCRIPTION OF THE DRAWINGS

Examples of embodiments herein are described in more detail with reference to the appended schematic drawings.

DETAILED DESCRIPTION

Figure 1:
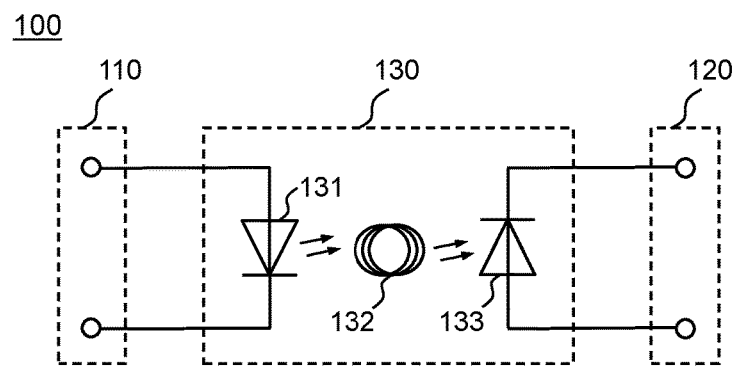
FIG. 1 is a schematic block diagram schematically depicting an example of a prior art optical communication system.

As part of the development towards embodiments herein, the situation and problem indicated in the Background will be further discussed.

The prior art solution in R. B. Childs, V. A. O'Byrne: "*Multichannel AM Video Transmission Using a High-Power Nd: YAG Laser and Linearized External Modulator*", IEEE Journal on Selected Areas in Communications, Vol 8, No. 7, September 1990, pp. 1369-1376, as mentioned in the Background, is not well suitable to be used with an optical communication system of the type a shown in FIG. 1. A simplified, schematic block diagram is shown in FIG. 2 over a communication system 200 applying said prior art solution. A pre-distorting block 240 based on anti-parallel chains of diodes in accordance with the prior art solution is connected in series with a non-linear block 230 located between an input port 210 and an output port 220. The non-linear block 230 may correspond to the non-linear block 130 in FIG. 1. The pre-distorting block 240 is located between the input port 210 and the non-linear block 230.

Figure 2:
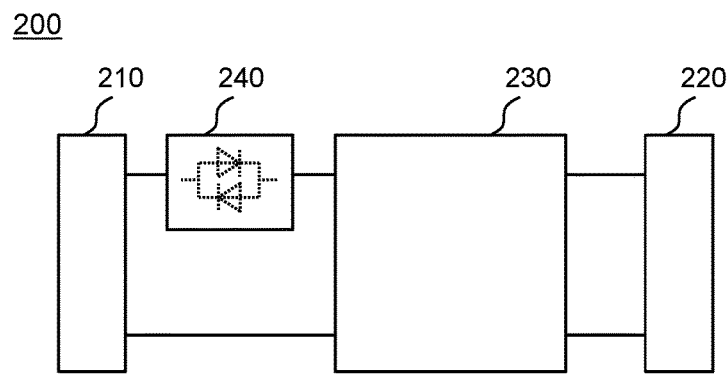
FIG. 2 is a schematic block diagram schematically depicting an example of a communication system with a prior art pre-distorter.

Hence, a pre-distorter, such as the pre-distorting block 240, based on said prior art solution is not so well suited to be used with such optical communication system as in FIG. 1. This may be explained by that an optical communication system of the type a shown in FIG. 1 is typically associated with a relatively mild form of non-linearity and said prior art solution is more suitable to linearize a stronger type of non-linearity, since the anti-parallel diodes of the prior art solution have an exponential relation between input and output.

Embodiments herein are based on a pre-distorter that instead of antiparallel diodes connected in series, is based on Junction Field Effect Transistors (JFETs) arranged in an antiparallel configuration, which pre-distorter may be connected in parallel to a non-linear part of the optical communication system causing the non-linearity, e.g. corresponding to the non-linear block 130 or 230.

Figure 3:
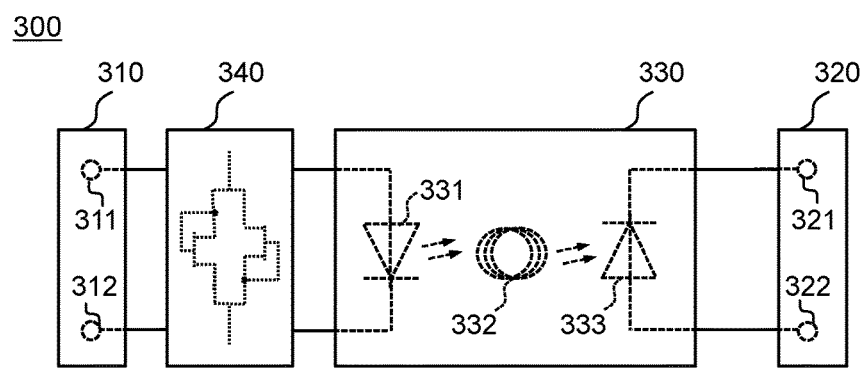
FIG. 3 is a schematic block diagram schematically depicting an example of an optical communication system and device according to embodiments herein.

FIG. 3 is a schematic block diagram schematically depicting an example of an optical communication system 300 comprising a device 340 according to embodiments herein. The device 340, which may be named pre-distorter, is for linearizing non-linear signal transmission characteristics of the optical communication system 300. The shown optical communication system 300 further comprises an input port 310, an output port 320 and a non-linearity introducing part 330 between said ports. The non-linearity introducing part 330 at least partly causes said non-linear signal transmission characteristics. As should be recognized the non-linearity introducing part 330 may correspond to the non-linear block 130 and may thus comprise a laser diode 331, an optical fiber 332 and a photo diode 333. Generally, the non-linearity introducing part 330 may comprise one or more laser diodes, e.g. the laser diode 331, for transmitting laser light via an optical fiber, e.g. the optical fiber 332. The non-linearity introducing part 330 may further comprise said optical fiber 332 and one or more receiving photo diodes, e.g. the photo diode 333, configured to receive, e.g. by being connected to said optical fiber 332, the laser light transmitted via the optical fiber 332.

In other words, the laser diode 331 may thus be arranged to be electrically operated via the input port 310 to emit laser light for communication into and via the optical fiber 332. The photo diode 333 may be configured to receive the laser light from the optical fiber and thereby generate an electrical signal at the output port 320.

The device 340, since it is a pre-distorter, is configured for connection between the input port 310 and the non-linearity introducing part 330, or in other words configured for connection before the non-linearity introducing part 330 since it is a pre-distorter. Further, the device 340 is configured for parallel connection with the non-linearity introducing part 330.

In the shown optical communication system 300, the device 340 is shown connected in parallel with the non-linearity introducing part 330, between said input port 310 and the non-linearity introducing part 330. In the shown example, the device 340 is configured to linearize non-linear signal transmission characteristics of the optical communication system 300, which non-linear signal transmission characteristics is at least partly caused by said non-linearity introducing part 330.

The device 340 comprises a pair of JFETs configured to operate in an anti-parallel configuration. The device 340 and details thereof will be further discussed below.

In the figure, the input port 310 is shown comprising two connectors 311 and 312, each connected to the device 340. One of the connectors of each port, e.g. connector 312 and 322, may be connected to a reference potential, typically ground, that may be common with the device 340 and at least a part of the non-linearity introducing part 330, e.g. the left part in the figure involving the laser diode 331. In case of a common reference potential there may be single conductor between the input port 310, e.g. the connector 311 thereof, and the device 340, and a single conductor between the device 340 and the non-linearity introducing part 330. In some embodiments, the device 340 is connected to the input port 310 by means of a first coaxial cable and to the non-linearity introducing part 330 by means of a second coaxial cable.

Hence, the connection of the device 340 may comprise connection of an input of the device 340 between a connector, e.g. connector 311, of the input port 310 and a reference potential, typically ground. In practise connection to ground may be accomplished by connection to a metal case of a circuit implementing the device 340.

In some embodiments the device 340 may instead be configured for differential input and/or output of signals, and there may be at least two conductors between the input port 310, e.g. from the connectors 311, 312 respectively, and the device 340, and/or at least two conductors between the device 340 and the non-linearity introducing part 330.

Hence, the connection of the device 340 may comprise a connection of an input, such as a differential input, of the device 340 to connectors, such as connectors 311, 312 of the input port 310.

A differential implementation of the device 340 may be beneficial, e.g. in case grounding within a non-differential implementation of the device 340 becomes problematic, e.g. if lengths of grounding paths cause problems. With a differential implementation, no grounding may be necessary except at an input and output balun.

The device 340 may be connected to an existing optical communication system, resulting in the optical communication system 300 or similar.

Note that since the optical fiber 332 electrically isolates the left part of the non-linearity introducing part 330 from the right part involving the photo diode 333, any reference potential, e.g. ground, of the left part and the right part may thus be electrically separated. The right part is however electrically connected with the output port 320.

It may be noted that in the figure, also the output port 320 is shown comprising two connectors 321 and 322, each connected to the non-linear linearity introducing part 330. As should be understood, similarly as for the input port 310, the output port 320 may be configured with one of the conductors connected to a reference potential, e.g. ground, or be configured for differential operation.

Attention is drawn to that FIG. 3 is only schematic and for exemplifying purpose and that not everything shown in the figure is required for all embodiments herein. Also, an optical communication system that in reality corresponds to the optical communication system 300 may comprise further components and elements, such as diodes, amplifiers, etc., as realized by the skilled person, but which are not shown herein for the sake of simplifying the description. For example, typically the one or more photo diodes, e.g. the photo diode 333, is followed by an amplifier also comprised in the non-linearity introducing part 330, since the received optical signal and power normally is too weak and low for further processing without amplifying. Also, the laser diode 331 may be preceded by, e.g., an amplifier or signal amplitude controlling, measuring and limiting part. There may also be a laser diode biasing block, but which is not shown or discussed herein for the sake of simplifying the description.

Figure 4:
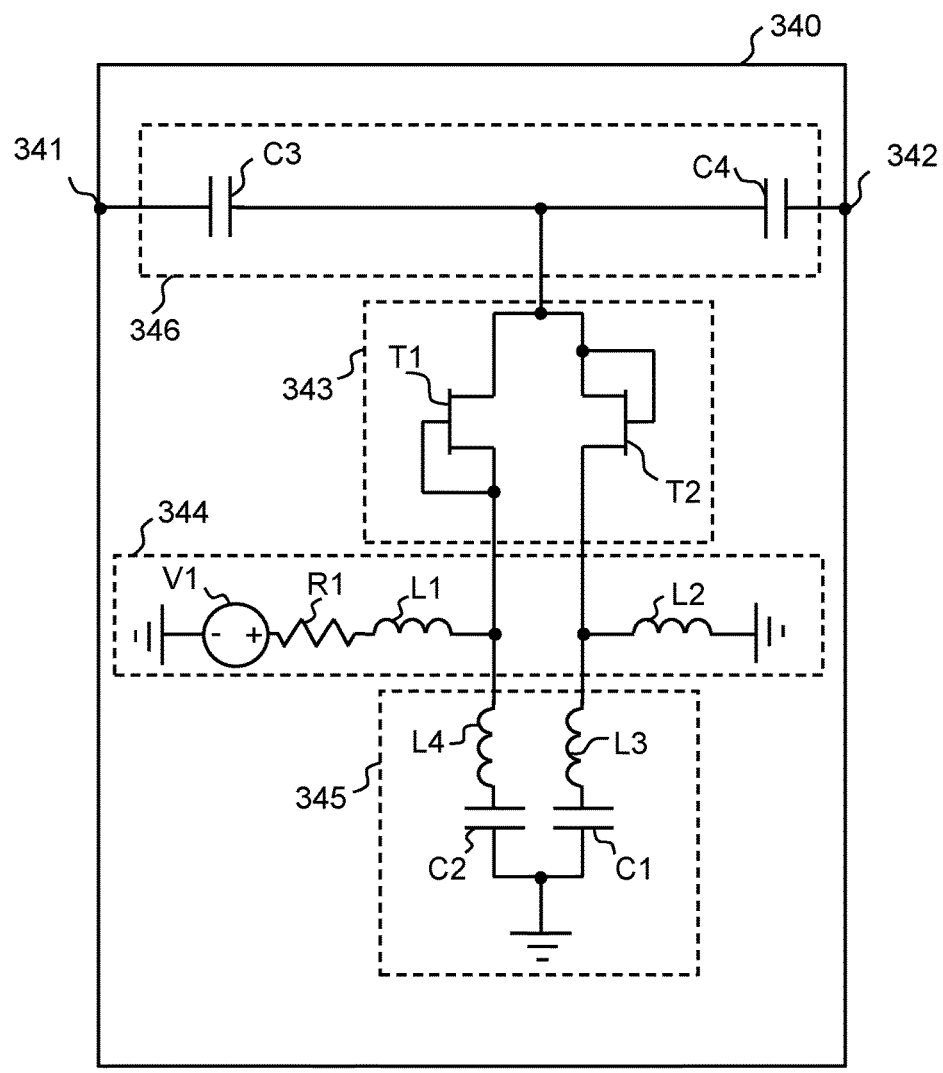
FIG. 4 is a schematic block diagram schematically depicting a more detailed example of a device according to embodiments herein.

FIG. 4 is a schematic circuit diagram for illustrating, by means of example, embodiments of the device 340 and how the device 340 may be implemented.

To simplify description of embodiments, different parts, or blocks, of the device 340 have been marked up in the figure and will be described both separately and in relation to each other. Note that the blocks as such are not marked or need to be separately arranged in a practical implementation, where components of the blocks, e.g., may be spread out and intermixed with other components.

The shown device 340 comprises a signal input 341 and a signal output 342. As should be recognized the shown device is based on input and output of signals relative to ground, which was a case discussed above in relation to FIG. 3, i.e. the signal input 341 may be connected to the connector 311 of the input port 310 and the connector 312 of the input port 310 may be connected to ground.

The shown device 340 comprises a first block 343 comprising a pair of JFETs T1, T2, which are an example of the above mentioned JFETs configured to operate in the anti-parallel configuration. Anti-parallel may be referred to as inverse parallel. Generally, components configured to operate in an anti-parallel configuration may refer to that the components are connected in parallel relative each other but configured to operate in inverse or opposite directions, e.g. by being arranged with reversed polarities. The first block 343 will be further discussed below.

The shown device 340 further comprises a second block 344 comprising a voltage source V1, a resistor R1, a first inductor L1 and a second inductor L2. As should be realized, the second block 344 comprises means for, and partly has the function of, suitably voltage biasing the JFETs T1, T2.

That is, the shown device 340 comprises means for voltage biasing the pair of JFETs T1, T2. The second block 344 will be further discussed below.

The shown device 340 also comprises a third block 345 comprising a first capacitor C1, a second capacitor C2, a third inductor L3, and a fourth inductor L4. The first capacitor C1 and the third inductor L3 are connected in series with the JFET T2, and the second capacitor C2 and the fourth inductor L4 are connected in series with the JFET T1. The third block 345 will be further discussed below.

Moreover, the shown device 340 comprises a fourth block 346 comprising a third capacitor C3 and a fourth capacitor C4 arranged in series between the signal input 341 and the signal output 342 of the device 340. As should be realized, the fourth block 346 comprises means for, and may generally at least partly have the function of, blocking Direct Current (DC) voltages from the signal input 341 and/or DC voltages to be output on the signal output 342.

Generally, in a practical situation, exactly how to arrange and configure the JFETs in a suitable anti-parallel configuration, selection of properties and values of these and other components, both in absolute terms and relative to each other, is within the capability of skilled person given requirements on the linearization and knowledge about the non-linearity introducing part 330 in the practical situation.

Said pair of JFETs, T1, T2 configured to operate in the anti-parallel configuration may be configured to operate in serial relative to each other at a DC voltage level and in anti-parallel relative to each other in an operative frequency range above said DC voltage level. The operative frequency range should comprise frequencies where the linearization is desired, such as frequencies for communication using the optical communication system 300. This may be accomplished by said blocks 343-346 and suitable properties and values of the components thereof. In the shown example, the "in series at the DC voltage level" may be accomplished by third block 345, which per JFET T1, T2, through C2, L4 and C1, L3, respectively, blocks DC voltages and low frequencies below said operative frequency range, and thereby makes JFETS T1, T2, through second block 344, to effectively operate in series relative to each other. This in turn may make blocks 343-345 to have no or little influence on input to output signals at DC voltage levels and at low frequencies. At higher frequencies, distanced from said DC voltage level and said low frequencies, i.e. in the operative frequency range, the third block 345 may instead become conducting and make the JFETs T1, T2 to instead operate in anti-parallel relative to each other and thus accomplish the "anti-parallel relative to each other in the operative frequency range above said DC voltage level".

Hence, in some embodiments, the pair of JFETs T1, T2 are configured to operate in anti-parallel in an operative frequency range by means of one or more circuits, e.g. inductor-capacitor circuits such as C2, L4 and C1, L2, as shown in first block 343. Said one or more circuits are connected between the pair of JFETs T1, T2 and a reference potential, in the shown example ground, and are in series with the pair of JFETs T1, T2.

In a specific example of a preferred embodiment, based on the device 340 shown in FIG. 4, components are associated with the following values: C1 30 pF (pico farad), C2 30 pF, C3 100 pF (pico farad), C4 100 pF, L1 100 nano henry (nH), L2 100 nH, L3 1 nH, L4 1 nH, R1 1000 ohm, and V1 10 volt. The specific example has been evaluated and the effect on the 3rd order intermodulation product was calculated, resulting in −8.04 dBm. This may be further improved by tuning the values of the components, e.g. of grounding capacitor and inductor values, i.e. values of C1, C2, L3, L4.

Attention is drawn to that FIG. 4 is only schematic and for exemplifying purpose and that not everything shown in the figure is required for all embodiments herein. A device or pre-distorter that in reality corresponds to the device 340 may comprise further or fewer components and elements, such as transistors, resistors, capacitors, inductors, wires, voltage sources, etc., as realized by the skilled person, but which are not shown nor further discussed herein for the sake of simplifying the description.

Advantages associated with embodiments herein e.g., include that implementation is enabled with a low, even minimum, number of distortion compensating elements. Also, the DC biasing facilitates tuning the linearization to e.g. result in low, or even minimum intermodulation, which is beneficial, since non-linearities and intermodulation may vary for different non-linearity introducing blocks, e.g between different existing optical communication systems, with e.g. different laser and photo diode pairs. There may even be variation between individual samples of components and/or over time. That is, in practice, a first non-linearity introducing block may result in different non-linearity and intermodulation than another, second, non-linearity introducing block even though they may be of the same design and even according the same specification.

Some differences will now be discussed between embodiments herein and the prior art solution discussed above in relation to FIG. 2, i.e. R. B. Childs, V. A. O'Byrne: *"Multichannel AM Video Transmission Using a High-Power Nd:YAG Laser and Linearized External Modulator", IEEE Journal on Selected Areas in Communications*, Vol 8, No. 7, September 1990, pp. 1369-1376. Embodiments herein may be realized with lower DC bias and using a DC voltage source instead of a current source and is thus easier to realize at high frequencies that typically are of interest for an optical communication system of the type discussed above. Also, biasing may be solved differently in embodiments herein, e.g. by means of a voltage source and inductors. Additionally, as already mentioned, the non-linearities of JFETs, as used in embodiments herein, are milder and therefore more suitable to use for linearization in the present context than the stronger non-linearities of junction diodes as in the prior art solution. The non-linearity of a JFET is of square law, or more generally of polynominal nature, and not exponential as of a junction diode. Also, as recognized, embodiments herein are based on operation in a parallel configuration, which alternatively may be named shunt configuration, and not in a serial configuration as in the prior art solution.

As used herein, "linearization" refers to making a non-linearity more linear, not necessarily completely or perfectly linear. In other words, non-linear signal transmission characteristics are counteracted. That is, negative impact of the non-linear signal transmission characteristics are reduced by making the signal transmission characteristics be more similar to linear signal transmission characteristics.

As used herein, the expression "between", e.g. as in "between X and Y" should be interpreted to include end points, i.e. to include X and Y in the example, if not explicitly stated otherwise.

As used herein, the expression "configured to" may mean that a processing circuit is configured to, or adapted to, by means of software or hardware configuration, perform one or more of the actions described herein.

As used herein, the terms "number", "value" may be any kind of digit, such as binary, real, imaginary or rational number or the like. Moreover, "number", "value" may be one or more characters, such as a letter or a string of letters. "number", "value" may also be represented by a bit string.

As used herein, the expression "in some embodiments" has been used to indicate that the features of the embodiment described may be combined with any other embodiment disclosed herein.

As used herein, the expression "transmit" and "send" are typically interchangeable.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the present disclosure, which is defined by the appending claims.

The invention claimed is:

1. A device for linearizing non-linear signal transmission characteristics of an optical communication system, said optical communication system comprising an input port, an output port and a non-linearity introducing part configured between said input port and said output port, which non-linearity introducing part at least partly causes said non-linear signal transmission characteristics, wherein said device is configured for connection between said input port and the non-linearity introducing part and in parallel with the non-linearity introducing part, the device comprising:
   a pair of Junction Field Effect Transistors (JFETs);
   a first circuit connected to the pair of JFETs and configured to operate the pair of JFETs in serial relative to each other at a Direct Current (DC) voltage level; and
   a second circuit connected to the pair of JFETs and configured to block the DC voltage level, but allow the pair of JFETs to operate in anti-parallel relative to each other in an operative frequency range above the DC voltage level.

2. The device as claimed in claim 1, wherein the first circuit comprises a circuit for voltage biasing the pair of JFETs.

3. The device as claimed in claim 2, wherein the second circuit is connected between the pair of JFETs and a reference potential.

4. The device as claimed in claim 3, wherein the non-linearity introducing part comprises one or more laser diodes for transmitting laser light via an optical fiber.

5. The device as claimed in claim 4, wherein the non-linearity introducing part further comprises said optical fiber and one or more receiving photo diodes configured to receive the laser light transmitted via the optical fiber.

6. An optical communication system comprising:
   an input port;
   an output port;
   a non-linearity introducing part configured between the input port and the output port, which non-linearity introducing part at least partly causes non-linear signal transmission characteristics in the optical communication system; and
   a device coupled in parallel with the non-linearity introducing part between said input port and the non-linearity introducing part, wherein the device comprises:
      a pair of Junction Field Effect Transistors (JFETs);
      a first circuit connected to the pair of JFETs and configured to operate the pair of JFETs in serial relative to each other at a Direct Current (DC) voltage level; and a second circuit connected to the pair of JFETs and configured to block the DC voltage level, but allow the pair of JFETs to operate in anti-parallel relative to each other in an operative frequency range above the DC voltage level.

7. The optical communication system as claimed in claim 6, wherein the first circuit comprises a circuit for voltage biasing the pair of JFETs.

8. The optical communication system as claimed in claim 7, wherein the second circuit is connected between the pair of JFETs and a reference potential.

9. The optical communication system as claimed in claim 8, wherein the non-linearity introducing part comprises one or more laser diodes for transmitting laser light via an optical fiber.

10. The optical communication system as claimed in claim 9, wherein the non-linearity introducing part further comprises said optical fiber and one or more receiving photo diodes configured to receive the laser light transmitted via the optical fiber.

* * * * *